Aug. 20, 1929.　　　A. J. HERSEY　　　1,725,189
SPRING CUSHIONING DEVICE
Filed Nov. 7, 1927
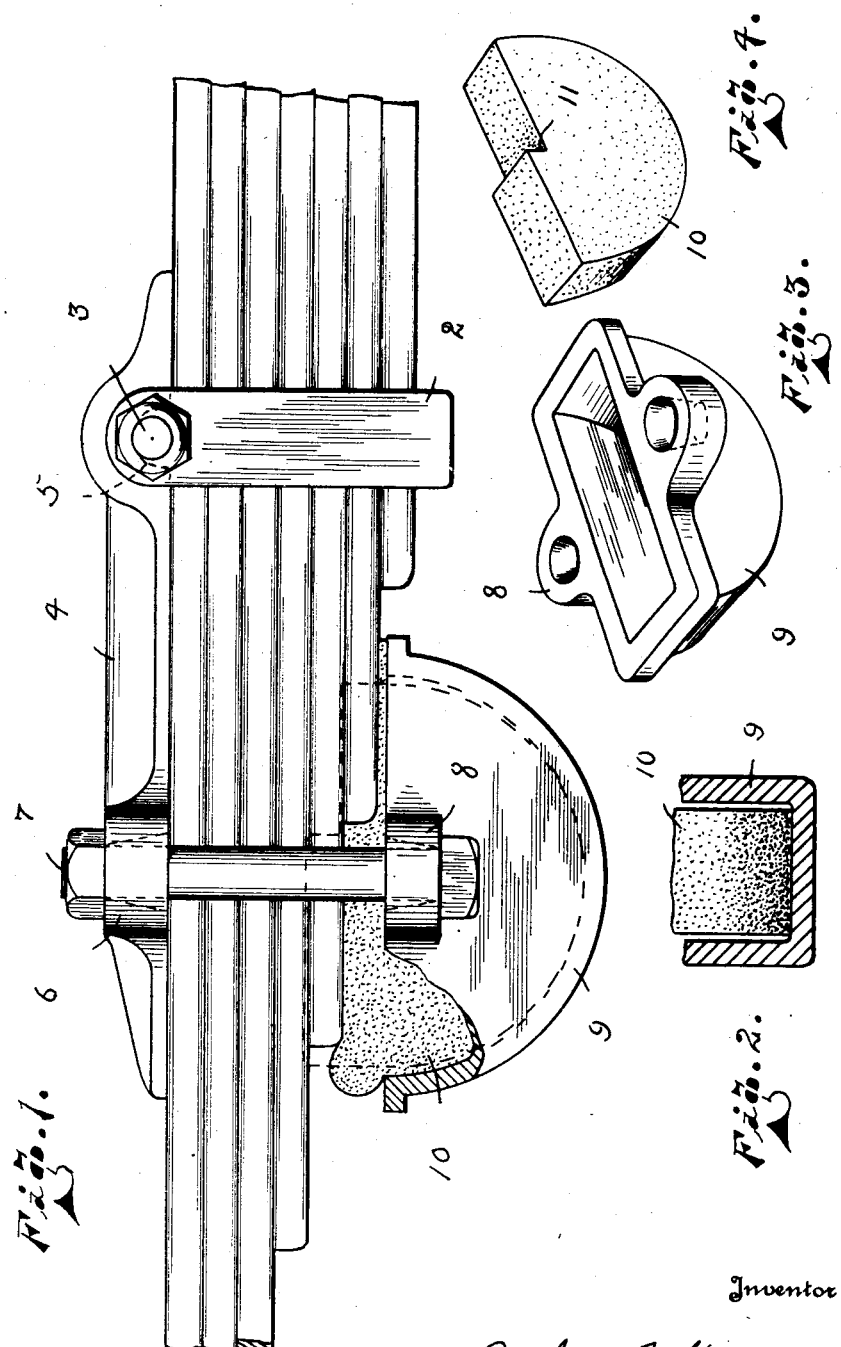
Inventor
Arthur J. Hersey
By Geo. Stevens
Attorney Patented Aug. 20, 1929.

1,725,189

UNITED STATES PATENT OFFICE.

ARTHUR J. HERSEY, OF MINNEAPOLIS, MINNESOTA, ASSIGNOR, BY DIRECT AND MESNE ASSIGNMENTS, TO AUTOMOTIVE PRODUCTS CO., A CORPORATION OF MINNESOTA.

SPRING-CUSHIONING DEVICE.

Application filed November 7, 1927. Serial No. 231,567.

This invention relates to cushioning means and has special reference to a device for direct attachment upon a multi-leaf vehicle spring for cushioning or absorbing the excessive action of same.

The principal object is to produce a more practical, simple and durable device of this character.

Other objects and advantages of the invention will appear in the further description thereof.

Referring now to the accompanying drawing, forming part of this application and wherein like reference characters indicate like parts:

Figure 1 is a side elevation of a fragmental portion of a multi-leaf vehicle spring having the improved shock absorber or cushioning device attached thereto, the latter being shown partly broken away;

Figure 2 is a transverse sectional view of the lower fragmental portion of the rubber housing of the cushioner;

Figure 3 is a perspective view of the complete rubber housing; and

Figure 4 is a similar view of one of the rubber cushions.

1 represents the vehicle spring which may as is obvious be composed of any number of leaves and which are universally held outwardly of the centers thereof by U-shaped clips or shackles, one of which is indicated at 2, the same comprising the U-shaped member 1 which engages three sides of the group of leaves, the free ends being held together by a through bolt 3 transverse the outermost leaf of the spring.

The preferred installation of the improved cushion embodies means for cooperative engagement with such common spring clips, and to this end there is provided the enlongated clamping member 4 having a transverse slot indicated at 5 upon the lower face thereof adjacent one end for surmounting the bolt 3 of the spring clip intermediate the free ends of said clip; while the opposite end of the clamping member 4 is provided with opposed laterally projecting lugs or ears 6 having through bolt holes therein for reception of the holding bolts 7 upon either side of the spring which extend downwardly and engage similar laterally projecting lugs or ears 8 formed upon the semi-circularly shaped cushion housing 9 which depends from the under side of the spring.

Within the cushion housing is installed the rubber cushion 10, it being of any desired resiliency and somewhat less in size than the housing, both diametrically and laterally, except that it normally projects considerably above the upper face of the housing, and in the embodiment here shown is stepped as at 11 to properly register with the stepped under surface of the spring. This upwardly projecting portion of the cushion is for the purpose of allowing adequate compression thereof within the housing without bringing the spring in direct contact with the latter so that when the cushioner is installed on the spring and the nuts on the bolts 7 drawn up tightly the assembly will appear substantially as indicated in Figure 1, and the holes in both pairs of lugs 6 and 8 being tapered will permit of relative longitudinal action of the members 4 and 9, the rubber readily yielding to such action and thus in no wise retarding the free flowage of the spring except as respects the tension desired and established by the bolts 7. By initially forming the cushion considerably less in size than the housing for same insures a snug fit within the housing immediately pressure is applied to the cushion.

From the foregoing it is evident that I have produced a novel form of cushioning means for a spring having the advantages of tightly holding the leaves of the spring against whipping action and yet providing relatively free lateral movement of the leaves without undue stress upon the cushioning device.

Having thus described a practical embodiment of the invention, the details of which, obviously, may be modified without departing from the spirit thereof, what I claim and desire to secure by Letters Patent is:

1. The combination with a vehicle spring having a clip thereupon, of a cushioning device comprising a clamp cooperatively associated with the clip and engaging the upper surface of the spring, a cushion housing beneath the clamping member, a cushion within the housing for direct engagement with the spring and means for adjustably uniting the housing and the clamping member.

2. A cushioner for springs of the class described comprising a clamp for engagement with one face of the spring, means for holding said clamp against horizontal movement upon the spring, a cushion housing upon the opposite face of the spring, a rubber cushion within the housing normally smaller than the chamber of the housing but projecting above same, and means for tightly holding the clamp and the housing in a predetermined relative position about the spring with the upper portion of the cushion intermediate of the housing and the spring.

3. The combination with a plurality of cooperative members, of means for holding said members in operative relation, one of said holding means comprising a housing, cushioning means comprising a unit of rubber within the housing and normally of less dimensions than the housing except towards the cooperative members for the purpose described.

4. The combination with a multi-leaf spring having a common clip thereupon having a transverse bolt above the spring, of a cushioning device comprising a clamping member overlieing the bolt and prone upon the spring, a housing beneath the spring and spaced from the end of the clamping member farthermost from the clip, and resilient means carried by the housing for engagement with the under surface of the spring.

5. A cushioning member for vehicle springs including a semi-disc shaped hollow housing, a similarly shaped unit of rubber within said housing normally of less horizontal dimensions than the interior of the housing, and means for clamping the housing to the spring substantially as described.

6. The combination with a multi-leaf spring, of a cushioning device therefor comprising a clamp for engagement with the upper surface of the spring, a semi-disc shaped hollow housing beneath the spring, a cushion within the housing having a stepped upper surface for registration with the spring.

7. The combination with a vehicle spring, of a cushioning device therefor comprising a clamp for engagement with the upper surface of the spring, a semi-disc shaped hollow housing beneath the spring, a cushion within the housing having a stepped upper surface for registration with the spring, means for holding the parts in operative relation, and means within the clamp and housing to permit limiting independent action of the clamp and housing.

In testimony whereof I affix my signature.

ARTHUR J. HERSEY.